US011135821B2

(12) United States Patent
Berger et al.

(10) Patent No.: US 11,135,821 B2
(45) Date of Patent: Oct. 5, 2021

(54) MULTILAYER COMPOSITE COMPRISING A FLUOROPOLYMER LAYER

(71) Applicant: Evonik Operations GmbH, Essen (DE)

(72) Inventors: Jasmin Berger, Dortmund (DE); Rainer Goering, Borken (DE); Klaus Gahlmann, Marl (DE); Michael Boeer, Olfen (DE); Mario Resing, Stadtlohn (DE)

(73) Assignee: Evonik Operations GmbH, Essen (DE)

( * ) Notice: Subject to any disclaimer, the term of this patent is extended or adjusted under 35 U.S.C. 154(b) by 96 days.

(21) Appl. No.: 15/073,101

(22) Filed: Mar. 17, 2016

(65) Prior Publication Data
US 2016/0271918 A1 Sep. 22, 2016

(30) Foreign Application Priority Data

Mar. 17, 2015 (EP) ..................................... 15159426

(51) Int. Cl.
| | |
|---|---|
| B32B 27/08 | (2006.01) |
| B32B 27/18 | (2006.01) |
| B32B 27/32 | (2006.01) |
| F16L 11/00 | (2006.01) |
| F16L 9/00 | (2006.01) |
| B32B 27/34 | (2006.01) |
| C08G 69/26 | (2006.01) |
| C08L 77/06 | (2006.01) |
| C08L 77/02 | (2006.01) |
| C08L 51/04 | (2006.01) |
| C08K 3/04 | (2006.01) |
| C08K 5/098 | (2006.01) |

(52) U.S. Cl.
CPC ............ *B32B 27/322* (2013.01); *B32B 27/08* (2013.01); *B32B 27/18* (2013.01); *B32B 27/32* (2013.01); *B32B 27/34* (2013.01); *C08G 69/265* (2013.01); *C08K 3/04* (2013.01); *C08K 5/098* (2013.01); *C08L 51/04* (2013.01); *C08L 77/02* (2013.01); *C08L 77/06* (2013.01); *F16L 9/00* (2013.01); *F16L 11/00* (2013.01); *B32B 2250/24* (2013.01); *B32B 2307/7242* (2013.01); *B32B 2439/00* (2013.01); *B32B 2597/00* (2013.01); *C08K 3/041* (2017.05)

(58) Field of Classification Search
CPC ....... C08G 69/265; B32B 27/06; B32B 27/18; B32B 27/304; B32B 27/322; B32B 27/34; F16L 11/00; F16L 9/00; Y10T 428/31743; Y10T 428/3175; C08L 77/06; C08L 77/10; C09D 177/06; C09D 177/10
USPC .......... 428/36.9, 36.91, 36.92, 421; 528/302, 528/339, 340; 524/607
See application file for complete search history.

(56) References Cited

U.S. PATENT DOCUMENTS

| | | | | |
|---|---|---|---|---|
| 5,387,645 A | * | 2/1995 | Montag ................ | C08G 69/265 525/179 |
| 5,510,160 A | | 4/1996 | Jadamus et al. | |
| 6,089,278 A | * | 7/2000 | Nishino ................... | B32B 1/08 138/137 |
| 6,686,012 B1 | * | 2/2004 | Molnar ................... | B32B 27/08 428/36.91 |
| 2002/0104575 A1 | * | 8/2002 | Nishi ....................... | B32B 1/08 138/137 |
| 2002/0134451 A1 | * | 9/2002 | Blasko ..................... | B32B 1/08 138/140 |
| 2004/0202908 A1 | * | 10/2004 | Schmitz ................... | B32B 1/08 428/474.4 |
| 2008/0083469 A1 | | 4/2008 | Cheng et al. | |
| 2008/0083470 A1 | | 4/2008 | Cheng et al. | |
| 2008/0118756 A1 | | 5/2008 | Bushelman et al. | |
| 2008/0145584 A1 | * | 6/2008 | Fish ........................ | B32B 27/34 428/36.91 |
| 2009/0314375 A1 | * | 12/2009 | Flat .......................... | B32B 1/08 138/137 |
| 2011/0139258 A1 | | 6/2011 | Doshi | |

(Continued)

FOREIGN PATENT DOCUMENTS

| | | |
|---|---|---|
| CN | 102753339 A | 10/2012 |
| CN | 102811852 A | 12/2012 |

(Continued)

OTHER PUBLICATIONS

Arkema, Lotader AX8900 Product Datasheet, https://www.lotryl.com/export/shared/.content/media/downloads/products-documentations/altuglas-international/pof/lotader/tds-lotader-ax8900.pdf, p. 1 (Year: 2018).*

Extended European Search Report dated Oct. 6, 2015 in Patent Application No. 15159426.4 (with English Translation of Category of Cited Documents).

*Primary Examiner* — Lee E Sanderson

(74) *Attorney, Agent, or Firm* — Oblon, McClelland, Maier & Neustadt, L.L.P.

(57) ABSTRACT

A multilayer composite containing the following layers: I. a first layer (layer I) of a moulding compound containing at least 40 wt. % of the following components: 1) 60 to 99 parts by wt. of a copolyamide based on hexamethylenediamine, terephthalic acid and an aliphatic dicarboxylic acid having 8 to 19 carbon atoms and 2) 40 to 1 parts by wt. of an olefinic copolymer as impact modifier, wherein the parts by wt. of 1) and 2) sum to 100; and II. a second layer (layer II) of a moulding compound containing at least 60 wt. % of fluoropolymer, has a high heat distortion temperature, a very good impact resistance, a high elongation at break and good layer adhesion.

14 Claims, No Drawings

(56) References Cited

U.S. PATENT DOCUMENTS

| | | | | |
|---|---|---|---|---|
| 2012/0196973 A1* | 8/2012 | Doshi | ................. | C08L 77/06 |
| | | | | 524/538 |
| 2012/0321829 A1* | 12/2012 | Bayer | ................. | C08G 69/36 |
| | | | | 428/36.9 |
| 2013/0032239 A1 | 2/2013 | Kuhmann et al. | | |
| 2013/0261237 A1* | 10/2013 | Qiu | ................. | C08L 53/02 |
| | | | | 524/210 |
| 2014/0296385 A1* | 10/2014 | Blondel | ................. | C08L 23/0869 |
| | | | | 523/439 |
| 2014/0299220 A1 | 10/2014 | Montanari et al. | | |
| 2016/0102202 A1* | 4/2016 | Lamberts | ................. | C08L 51/06 |
| | | | | 524/413 |
| 2018/0066133 A1* | 3/2018 | Chen | ................. | C08L 69/00 |

FOREIGN PATENT DOCUMENTS

| | | | |
|---|---|---|---|
| CN | 103476577 | A | 12/2013 |
| EP | 1 270 208 | A1 | 1/2003 |
| EP | 1 710 482 | A1 | 10/2006 |
| EP | 2 551 101 | A1 | 1/2013 |
| EP | 2 554 887 | A1 | 2/2013 |
| EP | 2 666 823 | A1 | 11/2013 |
| EP | 2 857 456 | A1 | 4/2015 |
| JP | 2006-265398 | A | 10/2006 |
| JP | 2013-514212 | A | 4/2013 |
| JP | 2014-240139 | A | 12/2014 |
| KR | 1020030024898 | | 3/2003 |
| WO | WO 01/81077 | A1 | 11/2001 |
| WO | WO 2005/018891 | A1 | 3/2005 |
| WO | WO 2006/056581 | A1 | 6/2006 |

\* cited by examiner

MULTILAYER COMPOSITE COMPRISING A FLUOROPOLYMER LAYER

BACKGROUND OF THE INVENTION

Field of the Invention

The present invention relates to a multilayer composite comprising a barrier layer of a fluoropolymer and a layer of a moulding compound based on an impact-modified partly aromatic polyamide. The multilayer composite is primarily a hollow article, for instance a hollow profile or a container for conducting or storing liquid or gaseous media.

Discussion of the Background

The development of multilayer composites employed, for example, as pipes for conducting liquid or gaseous media in motor vehicles is subject to automotive industry demands for an improved barrier effect, for fuel lines in particular, to reduce emissions of fuel components into the environment as well as to requirements of sufficient fuel resistance. This has resulted in the development of multilayer pipe systems where, for example, fluoropolymers are employed as the barrier layer material. Such multilayer composites comprising not only a fluoropolymer layer but also further layers based on aliphatic polyamides are known from U.S. Pat. No. 5,510,160, EP 1270 208 A1 and WO 01/81077 for example.

U.S. Pat. No. 5,510,160 describes a thermoplastic multilayer composite comprising a layer of a polyamide moulding compound and a layer of a moulding compound comprising polyvinylidene fluoride (PVDF) as the main component and also a small amount of a polyglutarimide. The polyglutarimide ensures that the PVDF layer adheres firmly to the polyamide layer. EP 1 270 208 A1 describes multilayer composites comprising a layer of a polyamide moulding compound and a layer of a carbonyl group-containing fluoropolymer adherent thereupon. The fluoropolymer is in particular an ethylene-tetrafluoroethylene copolymer (ETFE) or a terpolymer based thereon. WO 01/81077 describes a fuel line having a polyamide layer and a layer of a functionalized fluoropolymer based on ethylene, tetrafluoroethylene and optionally further comonomers.

Since there is a trend for higher temperatures in automotive engine bay applications the heat distortion temperature of aliphatic polyamides is often no longer sufficient for such applications. Efforts to replace aliphatic polyamides with partly aromatic polyamides have therefore been ongoing for some time. For instance, WO 2005/018891 describes hollow articles comprising at least one layer of an impact-modified partly aromatic polyamide; said articles may further comprise layers of an aliphatic polyamide but no further layers. This document teaches that, compared to PA 12, impact-modified partly aromatic polyamides have an improved barrier effect toward the diffusion of fuel components. However, for many applications, particularly at relatively high temperatures, this barrier effect is not yet sufficient.

Multilayer composites having a fluoropolymer layer and a layer based on a partly aromatic polyamide are known in principle; EP 1 710 482 A1, WO 2006/056581, EP 2 551 101 A1, EP 2 554 887 A1, EP 2 666 823 A1, US 2008/0083469 and US 2008/0083470 may be cited by way of example.

Polyamide-fluoropolymer composites where the polyamide has a crystalline melting point $T_m$ of at least 220° C. or better still of at least 240° C. and sufficient crystallinity would be desirable for automotive engine bay applications. These criteria are met by commercially available, crystalline partly aromatic polyamides. However, said polyamides are unsuitable for such applications because of their poor mechanical properties, in particular their poor impact resistance and low elongation at break. EP 2857456 A1 discloses measurements on moulding compounds composed of a PA6T/6I/66 and of a PA 10T/TMDT, each comprising 30 wt. % of different impact modifiers; the elongation at break is 3% to 6%. US 2014/0299220 A1 sheds further light; comparative example 22 therein shows a pipe comprising an 800 µm-thick layer of an impact-modified PA6T/6I/66 and a 200 µm-thick layer of an ETFE, the elongation at break of the pipe being 13%. Comparative example 24 shows a corresponding pipe where the polyamide layer is composed of an impact-modified PA9T whose diamine fraction is a 50:50 isomer mixture of 1,9-nonanediamine and 2-methyl-1,8-octanediamine; the elongation at break here is 22%. Finally, comparative example 27 shows a corresponding pipe where the polyamide layer is composed of an impact-modified further PA6T/6I/66; the elongation at break here is 18%. However, an elongation at break of the pipe of more than 100% is desirable.

Pipes having such a high elongation at break are described in US 2014/0299220 A1. The pipes in this published application comprise a fluoropolymer layer and a layer of an impact-modified moulding compound based on a partly aromatic polyamide; the latter comprises 50 to 75 mol % of subunits derived from an aromatic dicarboxylic acid and an aliphatic diamine having 9 to 13 carbon atoms and 25 to 50 mol % of subunits which are aliphatic and have 8 to 13 carbon atoms per nitrogen atom. However in this solution the monomer basis on the diamine side is relatively costly.

SUMMARY OF THE INVENTION

It is an object of the present invention to provide a composite which comprises a fluoropolymer layer and a polyamide layer and has a high heat distortion temperature, a high impact resistance and a high elongation at break and moreover exhibits good layer adhesion.

The present invention relates to a multilayer composite, comprising the following layers:

I. a first layer (layer I) of a moulding compound comprising at least 40 wt. % of the following components:
1) 60 to 99 parts by wt. of a partly aromatic copolyamide which contains monomer units which are obtained from
α) 30 to 90 mol % of a combination of hexamethylenediamine and terephthalic acid, and
β) 70 to 10 mol % of a combination of hexamethylenediamine and a linear aliphatic dicarboxylic acid having 8 to 19 carbon atoms;
wherein the mol % values relate to the sum of α) and β) and
wherein not more than 20% of the hexamethylenediamine is optionally replaced by the equivalent amount of another diamine, and/or
wherein not more than 20% of the terephthalic acid is optionally replaced by the equivalent amount of another aromatic dicarboxylic acid and/or 1,4-cyclohexanedicarboxylic acid, and/or
wherein not more than 20% of the repeating units containing hexamethylenediamine and linear aliphatic dicarboxylic acid is optionally replaced by the equivalent quantity of units obtained from a lactam/an ω-aminocarboxylic acid having 6 to 12 carbon atoms,
2) 40 to 1 parts by wt. of an olefinic copolymer as impact modifier, wherein the parts by wt. of 1) and 2) sum to 100; and II. a second layer (layer II) of a moulding compound comprising at least 60 wt. % of fluoropolymer.

DETAILED DESCRIPTION OF THE INVENTION

The ranges below include all values and subvalues between the lower and higher limit of the range.

The present invention relates to a multilayer composite comprising the following layers:

I. a first layer (layer I) of a moulding compound comprising at least 40 wt. %, preferably at least 50 wt. %, particularly preferably at least 60 wt. %, especially preferably at least 70 wt. % and very particularly preferably at least 80 wt. % of the following components:
   1) 60 to 99 parts by wt., preferably 65 to 98 parts by wt., particularly preferably 68 to 97 parts by wt. and especially preferably 70 to 96 parts by wt. of a partly aromatic copolyamide consisting of monomer units derived from
      α) 30 to 90 mol %, preferably 35 to 85 mol %, particularly preferably 40 to 80 mol %, especially preferably 41 to 75 mol % and very particularly preferably 45 to 70 mol % of a combination of hexamethylenediamine and terephthalic acid and
   β) 70 to 10 mol %, preferably 65 to 15 mol %, particularly preferably 60 to 20 mol %, especially preferably 59 to 25 mol % and very particularly preferably 55 to 30 mol % of a combination of hexamethylenediamine and a linear aliphatic dicarboxylic acid having 8 to 19 carbon atoms,
      wherein the mol % values relate to the sum of α) and β) and wherein not more than 20%, preferably not more than 15%, particularly preferably not more than 12%, especially preferably not more than 8% and very particularly preferably not more than 5% or not more than 4% of the hexamethylenediamine may be replaced by the equivalent amount of another diamine and/or wherein not more than 20%, preferably not more than 15%, particularly preferably not more than 12%, especially preferably not more than 8% and very particularly preferably not more than 5% or not more than 4% of the terephthalic acid may be replaced by the equivalent amount of another aromatic dicarboxylic acid and/or 1,4-cyclohexanedicarboxylic acid and/or wherein not more than 20%, preferably not more than 15%, particularly preferably not more than 12%, especially preferably not more than 8% and very particularly preferably not more than 5% or not more than 4% of the repeating units composed of hexamethylenediamine and linear aliphatic dicarboxylic acid may be replaced by the equivalent quantity of units derived from a lactam/an ω-aminocarboxylic acid having 6 to 12 carbon atoms,
   2) 40 to 1 parts by wt., preferably 35 to 2 parts by wt., particularly preferably 32 to 3 parts by wt. and especially preferably 30 to 4 parts by wt. of an olefinic copolymer as impact modifier,
   wherein the parts by wt. of 1) and 2) sum to 100; and
II. a second layer (layer II) of a moulding compound comprising at least 60 wt. %, preferably at least 70 wt. %, particularly preferably at least 80 wt. %, especially preferably at least 90 wt. % and very particularly preferably at least 95 wt. % of a fluoropolymer.

Suitable for employment as the linear aliphatic dicarboxylic acid having 8 to 19 carbon atoms are: octanedioic acid (suberic acid: $C_8$), nonanedioic acid (azelaic acid: $C_9$), decanedioic acid (sebacic acid; $C_{10}$), undecanedioic acid ($C_{11}$), dodecanedioic acid ($C_{12}$), tridecanedioic acid ($C_{13}$), tetradecanedioic acid ($C_{14}$), pentadecanedioic acid ($C_{15}$), hexadecanedioic acid ($C_{16}$), heptadecanedioic acid ($C_{17}$), octadecanedioic acid ($C_{18}$) and nonadecanedioic acid ($C_{19}$).

In accordance with the claims a portion of the hexamethylenediamine may optionally be replaced by another diamine. Any diamine is suitable here in principle and the following diamines may be cited by way of example: 1,10-decanediamine, 1,12-dodecanediamine, m-xylylenediamine, p-xylylenediamine, bis(4-aminocyclohexyl)methane, 2-methyl-1,5-pentanediamine and 1,4-bis-aminomethylcyclohexane. It will be appreciated that it is also possible to employ mixtures of such diamines. However, it is preferable when no further diamine is employed in addition to hexamethylenediamine.

In accordance with the claims a portion of the terephthalic acid may also optionally be replaced by another aromatic dicarboxylic acid or by 1,4-cyclohexanedicarboxylic acid. Any aromatic dicarboxylic acid is suitable here in principle and the following dicarboxylic acids may be cited by way of example: isophthalic acid, 4,4'-diphenyldicarboxylic acid, 4,4'-diphenyl ether dicarboxylic acid, 2,6-naphthalenedicarboxylic acid, 1,4-naphthalenedicarboxylic acid and 1,5-naphthalenedicarboxylic acid. It will be appreciated that it is also possible to employ mixtures of such dicarboxylic acids. However, it is preferable when no further aromatic dicarboxylic acid and/or no 1,4-cyclohexanedicarboxylic acid is employed in addition to terephthalic acid. Similarly, in accordance with the claims a portion of the repeating units composed of hexamethylenediamine and linear aliphatic dicarboxylic acid may optionally be replaced by a lactam/an ω-aminocarboxylic acid having 6 to 12 carbon atoms. Here, the repeating unit composed of hexamethylenediamine and linear aliphatic dicarboxylic acid corresponds to a unit derived from a lactam/an ω-aminocarboxylic acid. Examples of lactams/ω-aminocarboxylic acids having 6 to 12 carbon atoms include caprolactam, capryl lactam, undecanolactam, ω-aminoundecanoic acid, lauryl lactam and ω-aminododecanoic acid. Preference is given here to lactams/ω-aminocarboxylic acids having 11 or 12 carbon atoms. However, it is preferable when no lactam/no ω-aminocarboxylic acid is employed in addition to hexamethylenediamine and linear aliphatic dicarboxylic acid.

The composition of the partially aromatic copolyamide is advantageously selected such that its crystallite melting point $T_m$ as per ISO 11357 and measured at 2nd heating is in the range from 220° C. to 300° C., preferably in the range from 230° C. to 295° C. and particularly preferably in the range from 240° C. to 290° C. When there are several melting peaks $T_m$ is determined from the main melting peak.

The copolyamide is generally produced by melt polycondensation. Appropriate methods are related art. It is alternatively possible to employ any other known method of polyamide synthesis.

A necessarily equimolar combination of hexamethylenediamine and terephthalic acid is provided when it is ensured that these monomers can react in a molar ratio of 1:1. It may be noted that hexamethylenediamine is relatively volatile and that losses may therefore occur during the polycondensation which need to be compensated with a larger charge. It may moreover be necessary to deviate slightly from the exact stoichiometry to establish a particular end group ratio. The same applies to 1)β) for the necessarily equimolar combination of hexamethylenediamine and a linear aliphatic dicarboxylic acid having 8 to 19 carbon atoms.

In a preferred embodiment the partly aromatic polyamide has a ratio of amino end groups to the sum of amino and carboxyl end groups of 0.3 to 0.7 and particularly preferably 0.35 to 0.65. The fraction of amino end groups may be adjusted by controlling the polycondensation using methods known to those skilled in the art. Control may be effected by varying the ratio of diamine employed to dicarboxylic acid employed, by addition of a monocarboxylic acid or by addition of a monoamine. The fraction of amino end groups may also be adjusted by mixing two copolyamides, of which one is rich in amino end groups and the other is low in amino end groups, as pellets or as a melt.

The amino group content may be determined by titration of a solution of the copolyamide in m-cresol using perchloric acid. The determination of the carboxyl group content may be effected by titration of a solution of the copolyamide in o-cresol using KOH in ethanol. These methods are familiar to those skilled in the art.

The impact modifier is in particular an olefinic copolymer comprising units of the following monomers:
a) 20 to 99.9 wt. % and preferably 30 to 99.7 wt. % of one or more α-olefins having 2 to 12 carbon atoms,
b) 0 to 50 wt. % of one or more acrylic compounds selected from
   acrylic acid, methacrylic acid and salts thereof and esters of acrylic acid/methacrylic acid with a $C_1$ to $C_{12}$ alcohol, with the exception of epoxy group-containing esters such as glycidyl acrylate and glycidyl methacrylate,
c) 0.1 to 50 wt. % of an olefinically unsaturated epoxide or dicarboxylic anhydride,
wherein the wt. % values relate to the olefinic copolymer and sum to not more than 100. It should be noted that units derived from further comonomers, for example from styrene or an unconjugated diene, may additionally be present.

When the component c) is composed of units derived from an unsaturated dicarboxylic anhydride, said units are preferably present in amounts of 0.1 to 8 wt. %, particularly preferably 0.3 to 5 wt. %.

When the component c) is composed of units derived from an olefinically unsaturated epoxide, the acrylic compound according to b) comprises neither acrylic acid nor methacrylic acid.

In a first embodiment the impact modifier is an olefinic copolymer comprising the following monomer units:
   35 to 94.9 wt. %, preferably 40 to 90 wt. % and particularly preferably 45 to 85 wt. % of monomer units based on ethene,
   5 to 65 wt. %, preferably 10 to 60 wt. % and particularly preferably 15 to 55 wt. % of monomer units based on a 1-alkene having 4 to 8 carbon atoms,
   0 to 10 wt. % of monomer units based on another olefin and
   0.1 to 2.5 wt. % of monomer units based on an aliphatically unsaturated dicarboxylic anhydride,
   wherein the individual fractions are chosen such that these wt. % values sum to 100. Further inventive lower limits for the monomer units based on ethene are 34.9% wt. %, preferably 39.9 wt. % and particularly preferably 44.9 wt. %, while further inventive upper limits therefor are preferably 89.9 wt. % and particularly preferably 84.9 wt. %.

Suitable for employment in the olefinic copolymer as the 1-alkene having 4 to 8 carbon atoms are the following compounds: 1-butene, 1-pentene, 1-hexene, 1-heptene and 1-octene. It will be appreciated that the monomer units based on a 1-alkene having 4 to 8 carbon atoms may also be derived from mixtures of these compounds.

There is no restriction on the nature of the other olefin whose monomer units can make up from 0 to 10 wt. % of the olefinic copolymer. For example said olefin may be an unconjugated diene, a mono-ene such as propene, 4-methyl-1-pentene or styrene or a mixture thereof.

In a first variant the other olefin whose monomer units can make up from 0 to 10 wt. % of the olefinic copolymer is not an unconjugated diene.

In a second variant this other olefin is not styrene and/or not propene.

In a third variant the olefinic copolymer comprises only monomer units derived from ethene, a 1-alkene having 4 to 8 carbon atoms and an aliphatically unsaturated dicarboxylic anhydride.

In a fourth variant the 1-alkene having 4 to 8 carbon atoms is 1-butene.

In a fifth variant the 1-alkene having 4 to 8 carbon atoms is 1-hexene.

In a sixth variant the 1-alkene having 4 to 8 carbon atoms is 1-octene.

These variants may be combined with one another without restriction.

The aliphatically unsaturated dicarboxylic anhydride may be, for example, maleic anhydride but other corresponding compounds such as aconitic anhydride, citraconic anhydride or itaconic anhydride for instance are also suitable.

The olefinic copolymer according to the claims may be produced in known fashion, wherein the aliphatically unsaturated dicarboxylic anhydride or a precursor thereof, for example the corresponding acid or a half ester, is reacted with a preformed copolymer by thermal or preferably by free-radical reaction. Here the aliphatically unsaturated dicarboxylic anhydride may also be reacted in combination with other monomers, for example with dibutyl fumarate or styrene. Olefinic copolymers according to the claims are commercially available in various types.

In a second embodiment the impact modifier is an olefinic copolymer comprising the following monomer units:
   35 to 94.9 wt. %, preferably 40 to 90 wt. % and particularly preferably 45 to 85 wt. % of monomer units based on ethene,
   5 to 65 wt. %, preferably 10 to 60 wt. % and particularly preferably 15 to 55 wt. % of monomer units based on propene,
   0 to 10 wt. % of monomer units based on another olefin, for example an unconjugated diene, and
   0.1 to 2.5 wt. % of monomer units based on an aliphatically unsaturated dicarboxylic anhydride,
   wherein the individual fractions are chosen such that these wt. % values sum to 100. Further inventive lower limits for the monomer units based on ethene are 34.9% wt. %, preferably 39.9 wt. % and particularly preferably 44.9 wt. %, while further inventive upper limits therefor are preferably 89.9 wt. % and particularly preferably 84.9 wt. %.

In a third embodiment the impact modifier is a hydrogenated and anhydride-modified block copolymer comprising at least one polyvinylaromatic block A and at least one polyolefin block B. The blocks may be arranged in linear or star-shaped fashion, for example as structures of the type A-B, A-B-A, B-A-B, A-B-A-B, A-B-A-B-A, B-A-B-A-B, $(A)B_3$, $(B)A_3$, $(A)(B-A)_3$, $(B)(A-B)_3$, wherein the number-average molecular weight of these block copolymer is in the range from about 10 000 to about 800 000 and preferably in the range from about 20 000 to about 500 000. The fraction of vinylaromatic compound in the block copolymer is preferably 10 to 70 wt. % and particularly preferably 10 to 55 wt. %. The rubber-like polyolefin blocks B comprise, for example, ethylene/propylene, ethylene/butylene or ethylene/pentylene units; they are obtained by polymerization of conjugated dienes and, in particular, of butadiene, isoprene, 1,3-pentadiene, 2,3-dimethylbutadiene or mixtures thereof and by subsequent selective hydrogenation. This hydrogenates at least 80% of the aliphatic double bonds in the polymerized diene fraction, preferably at least 90% and particularly preferably at least 94%. The vinylaromatic compound used to produce the polyvinylaromatic block is typically styrene but it is also possible to employ α-methylstyrene or the like. The hydrogenated block copolymer comprises 0.1 to 8 wt. % and preferably 0.3 to 5 wt. % of succinic anhydride groups which are introduced by reaction with an unsaturated dicarboxylic acid or anhydride thereof such as maleic anhydride, citraconic acid, itaconic acid or the like either before or preferably after the hydrogenation. The production of such anhydride-modified, hydrogenated vinylaromatic/conjugated diene block copolymers is related art; suitable types are commercially available, for example under the trade name Kraton FG1901X. This is a linear triblock copolymer of the SEBS type (styrene-ethylene/butylene-styrene) having a polystyrene content of 30 wt. % and a content of succinic anhydride groups of 1.4 to 2 wt. %.

In a fourth embodiment the impact modifier is a mixture of
5 to 95 wt. % of an olefinic copolymer comprising units of the following monomers:
a) 20 to 99.9 wt. % of one or more α-olefins having 2 to 12 carbon atoms,
b) 0 to 50 wt. % of esters of acrylic acid or methacrylic acid with a $C_1$ to $C_{12}$ alcohol with the exception of epoxy group-containing esters, and
c) 0.1 to 50 wt. % of an olefinically unsaturated epoxide, wherein the wt. % values relate to the olefinic copolymer and sum to not more than 100, and
95 to 5 wt. % of an olefinic copolymer comprising units of the following monomers:
a) 42 to 99.9 wt. % of one or more α-olefins having 2 to 12 carbon atoms,
b) 0 to 50 wt. % of esters of acrylic acid or methacrylic acid with a $C_1$ to $C_{12}$ alcohol with the exception of epoxy group-containing esters, and
c) 0.1 to 8 wt. % of an olefinically unsaturated dicarboxylic anhydride,
wherein the wt. % values relate to the olefinic copolymer and sum to not more than 100.

The α-olefin having 2 to 12 carbon atoms is, for example, selected from ethene, propene, 1-butene, 1-pentene, 4-methylpent-1-ene, 1-hexene, 1-heptene, 1-octene, 1-nonene, 1-decene, 1-undecene and 1-dodecene, preference being given to ethene.

Examples of esters of acrylic acid or methacrylic acid include, in particular, methyl acrylate, ethyl acrylate, n-butyl acrylate, isobutyl acrylate, 2-ethylhexyl acrylate, methyl methacrylate, ethyl methacrylate, n-butyl methacrylate and 2-ethylhexyl methacrylate.

Examples of olefinically unsaturated epoxides include, in particular, glycidyl esters and glycidyl ethers, such as glycidyl acrylate, glycidyl methacrylate, glycidyl maleate, glycidyl itaconate, vinylglycidyl ether and allylglycidyl ether.

Examples of olefinically unsaturated dicarboxylic anhydrides include maleic anhydride, itaconic anhydride, citraconic anhydride, 2,3-dimethylmaleic anhydride and bicyclo[2.2.2]oct-5-ene-2,3-dicarboxylic anhydride.

In a fifth embodiment the impact modifier is a mixture of
70 to 99 wt. % of the impact modifier from the first embodiment and
1 to 30 wt. % of an olefinic copolymer comprising units of the following monomers:
a) 20 to 99.9 wt. % of one or more α-olefins having 2 to 12 carbon atoms,
b) 0 to 50 wt. % of esters of acrylic acid or methacrylic acid with a $C_1$ to $C_{12}$ alcohol with the exception of epoxy group-containing esters, and
c) 0.1 to 50 wt. % of an olefinically unsaturated epoxide, wherein the wt. % values relate to the olefinic copolymer and sum to not more than 100.

The details of the olefinic copolymer employed here are the same as described for the fourth embodiment.

In a sixth embodiment the impact modifier is a mixture of
70 to 99 wt. % of the impact modifier from the second embodiment and
1 to 30 wt. % of an olefinic copolymer comprising units of the following monomers:
a) 20 to 99.9 wt. % of one or more α-olefins having 2 to 12 carbon atoms,
b) 0 to 50 wt. % of esters of acrylic acid or methacrylic acid with a $C_1$ to $C_{12}$ alcohol with the exception of epoxy group-containing esters, and
c) 0.1 to 50 wt. % of an olefinically unsaturated epoxide, wherein the wt. % values relate to the olefinic copolymer and sum to not more than 100.

The details of the copolymer employed here are the same as described for the fourth embodiment.

In a seventh embodiment the impact modifier is a mixture of
50 to 99 wt. % of the impact modifier from the first embodiment and
1 to 50 wt. % of the hydrogenated and anhydride-modified block copolymer from the third embodiment.

In an eighth embodiment the impact modifier is a mixture of
50 to 99 wt. % of the impact modifier from the second embodiment and
1 to 50 wt. % of the hydrogenated and anhydride-modified block copolymer from the third embodiment.

These embodiments are merely exemplary. It is also possible in the context of the invention to employ other impact modifiers not cited here. The first embodiment is particularly preferred here since such moulding compounds have a particularly high thermal ageing resistance. Also preferable are the fifth and the seventh embodiment which likewise comprise the impact modifier from the first embodiment.

In addition to the components 1) and 2) the moulding compound of layer 1 used according to the invention optionally contains further additions which make up the balance to 100 wt. %, and preferably at least 0.01 wt. % thereof. Examples of these further additions include:
a) stabilizers,
b) other polymers,
c) plasticizers,
d) pigments and/or dyes,
e) additions which increase electrical conductivity and
f) processing aids.

In a preferred embodiment, the moulding compound contains an active amount of a copper-containing stabilizer. This is in particular a copper compound soluble in the polyamide matrix. The copper compound is preferably combined with an alkali metal halide.

In certain embodiments, the stabilizer is a copper(I) salt, e.g. copper acetate, copper stearate, an organic copper complex, for example copper acetylacetonate, a copper halide or the like in combination with an alkali metal halide.

In certain embodiments, the copper-containing stabilizer comprises a copper halide selected from copper iodide and copper bromide and an alkali metal halide selected from the iodides and bromides of lithium, sodium and potassium.

It is preferable to employ the copper-containing stabilizer in an amount such that the moulding compound contains 20 to 2000 ppm of copper, particularly preferably 30 to 1500 ppm of copper and especially preferably 40 to 1000 ppm of copper.

It is further preferable when the copper-containing stabilizer has a composition such that the weight ratio of alkali metal halide to copper compound is in the range from 2.5 to 12 and particularly preferably in the range from 6 to 10. The combination of alkali metal halide and copper compound is generally present in the moulding compound in an amount of from about 0.01 wt. % to about 2.5 wt. %.

The copper-containing stabilizer offers protection against long-term thermal ageing, for example in under-bonnet automobile applications.

In a further preferred embodiment, the moulding compound comprises an active amount of an oxidation stabilizer and particularly preferably an active amount of an oxidation stabilizer in combination with the active amount of a copper-containing stabilizer. Examples of suitable oxidation stabilizers include aromatic amines, sterically hindered phenols, phosphites, phosphonites, thio synergists, hydroxylamines, benzofuranone derivatives, acryloyl-modified phenols etc. A great many types of such oxidation stabilizers are commercially available, for example under the trade names Naugard 445, Irganox 1010, Irganox 1098, Irgafos 168, P-EPQ or Lowinox DSTDP. The moulding compound generally comprises about 0.01 to about 2 wt. % and preferably about 0.1 to about 1.5 wt. % of an oxidation stabilizer.

The moulding compound may moreover further comprise a UV stabilizer/a light stabilizer of the HALS type. Suitable UV stabilizers are primarily organic UV absorbers, for example benzophenone derivatives, benzotriazole derivatives, oxalanilides or phenyltriazines. Light stabilizers of the HALS type are tetramethylpiperidine derivatives; these are inhibitors which act as radical scavengers. UV stabilizers and light stabilizers may advantageously be used in combination. A great many types of both are commercially available; the manufacturer's instructions can be followed in respect of the amounts employed.

The moulding compound may additionally comprise a hydrolysis stabilizer, for instance a monomeric, oligomeric or polymeric carbodiimide or a bisoxazoline.

Examples of other polymers which may be present in the moulding compound as an addition include aliphatic polyamides, polyether amides, or polytetrafluoroethylene (PTFE).

Examples of suitable aliphatic polyamides include PA46, PA66, PA68, PA610, PA612, PA613, PA410, PA412, PA810, PA1010, PA1012, PA1013, PA1014, PA1018, PA1212, PA6, PA11 and PA12 and also copolyamides derived from these types. It is preferable when the polyamide fraction of the moulding compound composed of the partially aromatic copolyamide, optionally aliphatic polyamide and optionally polyether amide comprises less than 10 wt. %, particularly preferably less than 8 wt. %, especially preferably less than 5 wt. % and very particularly preferably less than 3 wt. % of aliphatic polyamide or preferably less than 10 w %, particularly preferably less than 8 wt. %, especially preferably less than 5 wt. % and very particularly preferably less than 3 wt. % of the sum of aliphatic polyamide and polyether amide.

Plasticizers and the use thereof in polyamides are known. A general overview of plasticizers suitable for polyamides may be found in Gächter/Müller, Kunststoffadditive [Plastics additives], C. Hanser Verlag, 2nd edition, p 296.

Examples of conventional compounds suitable for employment as plasticizers include esters of p-hydroxybenzoic acid having 2 to 20 carbon atoms in the alcohol component or amides of arylsulphonic acids having from 2 to 12 carbon atoms in the amine component, preferably amides of benzenesulphonic acid.

Suitable plasticizers include, inter alia, ethyl p-hydroxybenzoate, octyl p-hydroxybenzoate, i-hexadecyl p-hydroxybenzoate, toluenesulphonic acid n-octylamide, benzenesulphonic acid n-butylamide or benzenesulphonic acid 2-ethylhexylamide.

Examples of suitable pigments and/or dyes include carbon black, iron oxide, zinc sulphide, ultramarine, nigrosin, pearlescent pigments and metal flakes.

Examples of additions which increase in electrical conductivity include conductivity carbon black or carbon nanotubes.

Examples of suitable processing aids include paraffins, fatty alcohols, fatty acid amides, stearates such as calcium stearate, paraffin waxes, montanates or polysiloxanes.

The moulding compound is produced from the individual constituents in a manner known to those skilled in the art by melt mixing.

The fluoropolymer employed for layer II may be, for example, a polyvinylidene fluoride (PVDF), a copolymer based on vinylidene fluoride comprising up to 40 wt. % of other monomers such as trifluoroethylene, chlorotrifluoroethylene, ethylene, propene and hexafluoropropene for example, an ethylene-tetrafluoroethylene copolymer (ETFE), an ETFE modified using a ter component such as propene, hexafluoropropene, vinyl fluoride or vinylidene fluoride for example (for example EFEP), an ethylene-chlorotrifluoroethylene copolymer (E-CTFE), a polychlorotrifluoroethylene (PCTFE), a tetrafluoroethylene-hexafluoropropene-vinylidene fluoride copolymer (THV), a tetrafluoroethylene-hexafluoropropene copolymer (FEP) or a tetrafluoroethylene-perfluoroalkyl vinyl ether copolymer (PFA). These polymers are known to those skilled in the art and are commercially available in a great many varieties, further description thus being dispensed with.

The fluoropolymer of layer II is preferably adhesion-modified, i.e. functional groups are present that can react with amino groups of the polyamide, thus permitting bonding of the phases. Such adhesion modification may generally be achieved in two ways:

Either the fluoropolymer contains built-in functional groups, for example acid anhydride groups or carbonate groups, as described in U.S. Pat. No. 5,576,106, US-A-2003148125, US-A-2003035914, US-A-2002104575, JP-A-10311461, EP-A-0 726 293, EP-A-0 992 518 or WO 9728394;

or the fluoropolymer moulding compound comprises a functional group-containing polymer which is miscible or at least compatible with the fluoropolymer. Such systems are disclosed in U.S. Pat. No. 5,510,160 and in U.S. Pat. No. 5,554,426 for example, which are hereby expressly incorporated by reference. The modified fluoropolymer in U.S. Pat. No. 5,510,160 is composed of 97.5 to 50 wt. %, preferably 97.5 to 80 wt. % and particularly preferably 96 to 90 wt. % of PVDF and 2.5 to 50 wt. %, preferably 2.5 to 20 wt. % and particularly preferably 4 to 10 wt. % of an acrylate copolymer comprising at least the following basic building blocks:
i) 14 to 85 wt. % of ester building blocks,
ii) 0 to 75 wt. % of imide building blocks,
iii) 0 to 15 wt. % of carboxylic acid building blocks and iiii) 7 to 20 wt. % of carboxylic acid anhydride building blocks.

The fluoropolymer moulding compound may further comprise customary assistants and added substances.

The multilayer composite according to the invention may additionally comprise further layers, for example a further layer I, a further layer II, a layer of a moulding compound based on an aliphatic polyamide, a layer of a moulding compound based on a thermoplastic polyester or an ethylene-vinyl alcohol copolymer (EVOH), and/or an adhesion promoter layer.

The moulding compound based on an aliphatic polyamide comprises at least 40 wt. %, preferably at least 50 wt. %, particularly preferably at least 60 wt. % and especially preferably at least 70 wt. % of an aliphatic polyamide; said compound may further comprise an impact modifier and customary additions, for example of the type described for the moulding compound of layer I. Examples of suitable aliphatic polyamides include PA46, PA66, PA68, PA610, PA612, PA613, PA410, PA412, PA810, PA1010, PA 1012, PA 013, PA1014, PA1018, PA1212, PA6, PA11 and PA12 and also copolyamides derived from these types. Here, preference is given to aliphatic polyamides having a crystallite melting point $T_m$ above 190° C., particularly preferably above 200° C. and especially preferably above 210° C.

The multilayer composite according to the invention may be in the form of a flat composite, for example in the form of a sheet or film, for instance in the form of packaging film, wherein the barrier effect of the fluoropolymer towards gases such as oxygen and carbon dioxide for example is utilized, or in the form of antiwear tape for flexible pipes for offshore extraction.

In one preferred embodiment the multilayer composite according to the invention is a hollow article, primarily a pipe or a container. This includes, for example, fuel lines, hydraulic lines, brake lines, clutch lines or coolant lines, brake fluid containers or fuel containers. Further applications are, for example, liners for rigid or flexible pipes in the oil or gas extraction industry or lines for umbilicals in which hot liquids are conveyed. When the inner layer is in contact with petrol or biodiesel, it preferably comprises no copper stabilizer.

When the multilayer composite according to the invention is used for conducting or storing flammable liquids, gases or dusts, for example fuel or fuel vapours, it is advisable to impart one of the layers belonging to the composite or an additional inner layer with electrical conductivity. This may be achieved by compounding with an electrically conductive addition according to any related art method. Examples of conductive additions that may be employed include conductive carbon black, metal flakes, metal powder, metallized glass beads, metallized glass fibres, metal fibres (for example of stainless steel), metallized whiskers, carbon fibres (also metallized carbon fibres), intrinsically conductive polymers or graphite fibrils. Mixtures of different conductive additions may also be employed.

The electrically conductive layer is preferably in direct contact with the medium to be conducted or stored and has a specific surface resistance of not more than $10^9$ Ω/square. The measurement method for determining the resistance of multilayer pipes is elucidated in SAE J 2260 of November 2004.

When the multilayer composite according to the invention is implemented as a hollow article or hollow profile (for example a pipe), said composite may further be sheathed in an additional elastomer layer. Both crosslinking rubber compositions and thermoplastic elastomers are suitable for the sheathing. The sheathing may be applied to the multilayer composite either with or without the use of an additional adhesion promoter, for example by extrusion through a crosshead die or by pushing a prefabricated elastomer hose over the previously extruded multilayer pipe. The sheathing generally has a thickness of 0.1 to 4 mm and preferably of 0.2 to 3 mm.

Examples of suitable elastomers include chloroprene rubber, ethylene-propylene rubber (EPM), ethylene-propylene-diene rubber (EPDM), epichlorohydrin rubber (ECO), chlorinated polyethylene, acrylate rubber, chlorosulphonated polyethylene, silicone rubber, Santoprene, polyetheresteramides or polyetheramides.

The multilayer composite may be fabricated in a single-stage or multistage procedure, for example by a single-stage process by means of sandwich moulding, coextrusion, coextrusion blow moulding (also 3D blow moulding, extrusion of a parison into an open half-mould, 3D parison manipulation, suction blow moulding, 3D suction blow moulding, sequential blow moulding for example) or by multistage processes as described in U.S. Pat. No. 5,554,425 for example.

The table which follows lists possible exemplary layer configurations. These examples are intended only for illustration with no intention to restrict the scope of the invention. The cited layer configurations generally apply independently of geometry, i.e. also to films. However, said configurations also apply specifically to hollow articles such as hollow profiles, for example pipes or containers; in this case the layer as per a) is the outer layer.

| Configuration | Layer sequence |
|---|---|
| 1 | a) layer I |
|   | b) layer II |
| 2 | a) layer I |
|   | b) layer II |
|   | c) layer of a moulding compound based on an aliphatic polyamide |
| 3 | a) layer of a moulding compound based on an aliphatic polyamide |
|   | b) layer II |
|   | c) layer I |
| 4 | a) layer I |
|   | b) adhesion promoter layer for example as per U.S. Pat. No. 5,500,263 |
|   | c) layer II (not modified to impart adhesion) |
|   | d) adhesion promoter layer for example as per U.S. Pat. No. 5,500,263 |
|   | e) layer I |
| 5 | a) layer I |
|   | b) layer II |
|   | c) layer I |
| 6 | a) layer I |
|   | b) layer of an EVOH moulding compound |
|   | c) layer I |
|   | d) layer II |
| 7 | a) layer I |
|   | b) layer II |
|   | c) layer I (imparted with electrical conductivity) |
| 8 | a) layer I |
|   | b) layer II |
|   | c) layer of a moulding compound based on an aliphatic polyamide (imparted with electrical conductivity) |
| 9 | a) layer I |
|   | b) adhesion promoter layer for example as per U.S. Pat. No. 6,355,358 |
|   | c) layer of a moulding compound based on a thermoplastic polyester |
|   | d) adhesion promoter layer for example as per U.S. Pat. No. 6,355,358 |
|   | e) layer II |

| Configuration | Layer sequence |
|---|---|
| 10 | a) layer I<br>b) layer II<br>c) layer I<br>d) layer I (imparted with electrical conductivity) |
| 11 | a) layer I<br>b) layer II (modified to impart adhesion)<br>c) layer II (not modified to impart adhesion; imparted with electrical conductivity) |
| 12 | a) elastomer layer<br>b) layer I<br>c) layer II<br>d) layer I |
| 13 | a) elastomer layer<br>b) layer I<br>c) layer II (modified to impart adhesion)<br>e) layer II (not modified to impart adhesion; imparted with electrical conductivity) |

The composites according to the invention exhibit a high heat distortion temperature, a very good impact resistance and a high elongation at break. It has moreover been found that only a very small amount of oligomers is washed out of the layer I moulding compound employed according to the invention when said compound is employed as the innermost layer; there are thus no blockages in the fuel supply to the engine. The barrier effect of pipes according to the invention towards fuel components is very good.

Having generally described this invention, a further understanding can be obtained by reference to certain specific examples which are provided herein for purposes of illustration only, and are not intended to be limiting unless otherwise specified.

EXAMPLES

The invention is illustrated by way of example hereinbelow.

The following materials were employed in the examples:
PA6T/612: see production example 1
Colour batch: mixture of 80 wt. % of PA 12 and 20 wt. % of carbon black
TAFMER® MH7010: an anhydride-modified ethylene-butylene rubber from Mitsui Chemicals
Calcium stearate: processing aid
Polyad® PB201 iodide: copper-containing stabilizer based on copper iodide and alkali metal halide
Naugard® 445: oxidation stabilizer (aromatic amine)
Adherent PVDF: mixture as per EP-A-0 673 762 of 95 wt. % of a commercially available PVDF and 5 wt. % of a Polyglutarimide constructed from the following basic building blocks:
57 wt. % derived from methyl methacrylate,
30 wt. % of the N-methyl glutarimide type,
3 wt. % derived from methacrylic acid and
10 wt. % of the glutaric anhydride type (produced by reaction of methyl methacrylate with an aqueous solution of methylamine in a melt)
NEOFLON™ EP-7000: modified ETFE
HI-PA6T/612: the impact-modified PA6T/612 moulding compound employed in accordance with the invention Production Example 1

PA6T/612 50:50

A polycondensation vessel was initially charged with 12.621 kg of hexamethylenediamine, 9.021 kg of terephthalic acid, 13.356 kg of dodecanedioic acid, 15.000 kg distilled water and 3.53 g of a 50 weight percent aqueous solution of hypophosphorous acid. The starting materials were melted at 180° C. and stirred for 3 hours at 225° C./22 bar. The mixture was heated to 300° C. with continuous decompression to 10 bar and then further decompressed at this temperature. Once a pressure of 0.5 bar was obtained the vessel was emptied and the product was pelletized. The granules were subjected to postcondensation in a tumble dryer and thus brought to the desired molecular weight.

Crystallite melting point $T_m$: 278° C. (main peak)
Production of the Moulding Compound (HI-PA6T612) Employed in Accordance with the Invention:

This employed 65.38 parts by wt. of the previously produced PA6T/612, 30 parts by wt. of TAFMER MH7010, 2.5 parts by wt. of colour batch, 1.2 parts by wt. of Polyad PB201 iodide, 0.6 part by wt. of Naugard 445 and 0.32 part by wt. of calcium stearate. The moulding compound was produced from the individual constituents by melt mixing in a kneading unit and then extruded, pelletized and dried.

Reference:
An IDE ME 45/4×25D single-layer pipe extrusion apparatus was used to produce single-layer pipes having an outside diameter of 8.0 mm and a wall thickness of 1.0 mm from the moulding composition employed in accordance with the invention, at 280° C. and 100 rpm.

Examples 1 to 3

A Bellaform multilayer pipe apparatus was used to produce multilayer pipes having an outside diameter of 8.0 mm and a total wall thickness of 1.0 mm in each case. The layer configurations are shown in Table 1.

Tests:
a) Tensile test: The single- and multilayer pipes were tested in accordance with DIN EN ISO 527-1 at a takeoff speed of 100 mm/min. The test specimens had a length of about 200 mm, the clamped length was 100 mm and strain sensor spacing was 50 mm.
b) Impact bending test: Measurement of impact resistance for the single- and multilayer pipes was performed in accordance with DIN 73378 at 23° C. and −40° C. Ten pipe sections of about 100 mm in length were used in each case.
c) Fall hammer test: The fall hammer test was carried out as per SAE specifications. This comprised allowing a specific weight to fall onto the test specimen from a prescribed fall height. This test was used to determine the impact resistance characteristics under the effect of an impact of the single- and multilayer pipes according to SAE J2260 and SAE J844. In each case ten test specimens were measured at −40° C. and, once subjected to the test, visually inspected for damage.
d) Separation test: The separation test was carried out with a Zwick BZ 2.5/TN 1S tensile tester to which a tensile device and a rotating metal wheel are attached to enable the individual layers of the test sample to be separated from one another. The separation test in accordance with DIN EN ISO 2411 was used to determine the adhesion between two layers by measuring the force required to separate the two layers from one another. To this end, pipe sections of the multilayer pipes 20 cm in length were divided longitudinally into three portions using a cutting device.

Prior to starting measurement, calipers were used to measure the sample width repeatedly at different points and the average value was entered into the evaluation software.

The incipiently separated end of one layer was then held in a clamp which continuously pulled said layer from the second layer at an angle of 90°.

The layers were pulled apart at a test speed of 50 mm/min while, simultaneously, a diagram of the required force in newtons versus the displacement in millimetres was recorded. This diagram was used to determine the separation resistance in newt.ons per millimetre which relates to the width of the adherent contact area.

The results are shown in Table 1.

TABLE 1

Layer configurations and test results

|  | Reference | Example 1 | Example 2 | Example 3 |
|---|---|---|---|---|
| outer layer | HI-PA6T/612, 1.0 mm | HI-PA6T/612; 0.45 mm | HI-PA6T/612; 0.8 mm | HI-PA6T/612; 0.75 mm |
| interlayer | — | adherent PVDF; 0.1 mm | — | — |
| inner layer | — | HI-PA6T/612; 0.45 mm | adherent PVDF; 0.2 mm | NEOFLON ™ EP-7000; 0.25 mm |
| adhesion [N/mm] |  | outer layer to interlayer: 4.3 interlayer to inner layer: 5.1 | outer layer to inner layer: 6.2 | outer layer to inner layer: 4.1 |
| modulus of elasticity [MPa] | 1121 | 1070 | 1070 | 646 |
| tensile stress at break [MPa] | 44 | 39 | 35 | 36 |
| elongation at break [%] | 480 | 414 | 339 | 386 |
| impact resistance 23° C. | no fracture | no fracture | no fracture | no fracture |
| fall hammer test SAE J2260, −40° C. | no fracture | no fracture | no fracture | no fracture |

European patent application EP15159426 filed Mar. 17, 2015, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A multilayer composite, comprising layers I and II:
wherein layer I comprises
at least 40 wt. % of components 1) and 2):
1) a copolyamide having a crystallite m.p. of from 240 to 290° C. when measured as per ISO 11357 at 2nd heating, which contains as copolymerized monomer units:
α) 30 to 90 mol % of a combination of hexamethylenediamine and terephthalic acid, and
β) 70 to 10 mol % of a combination of hexamethylenediamine and a linear aliphatic dicarboxylic acid having 8 to 19 carbon atoms;
wherein the mol % values relate to the sum of α) and β) and
optionally, wherein not more than 20 mol % of the hexamethylenediamine is replaced by the equivalent amount of another diamine, and/or
optionally, wherein not more than 20 mol % of the terephthalic acid is replaced by the equivalent amount of another aromatic dicarboxylic acid and/or 1,4-cyclohexanedicarboxylic acid, and/or
optionally, wherein not more than 20 mol % of the repeating units containing hexamethylenediamine and linear aliphatic dicarboxylic acid is replaced by the equivalent quantity of units obtained from a lactam/an ω-aminocarboxylic acid having 6 to 12 carbon atoms,
2) an olefinic copolymer as impact modifier, the olefinic copolymer consisting of:
a) 50 to 99.9 wt % of ethene and 1-butene, and
c) 0.1 to 50 wt % of an olefinically unsaturated dicarboxylic anhydride;
wherein when total parts by weight of 1) and 2) is 100 parts, the parts of 2) is from 1 to 40,
and at least 0.01 wt % of
3) at least one additive selected from the group consisting of stabilizers, plasticizers, pigments, dyes, and an additive to increase electrical conductivity;
wherein the total wt % of components 1), 2), and 3) is 100% relative to the total weight of layer I, and
II. a second layer (layer II) of a moulding compound comprising at least 60 wt. % of fluoropolymer; wherein the layer II is in contact with the layer I.

2. The multilayer composite according to claim 1, wherein layer I comprises 0.01 to 60 wt. % of the at least one additive.

3. The multilayer composite according to claim 2, wherein the at least one additive comprises a copper-containing stabilizer.

4. The multilayer composite according to claim 2, wherein the at least one additive comprises an oxidation stabilizer.

5. The multilayer composite according to claim 1, wherein the fluoropolymer of the moulding compound of layer II comprises a polymer selected from the group consisting of
a polyvinylidene fluoride (PVDF),
a copolymer based on vinylidene fluoride comprising up to 40 wt. % of another monomer,
an ethylene-tetrafluoroethylene copolymer (ETFE),
an ETFE modified using a ter component,
an ethylene-chlorotrifluoroethylene copolymer (E-CTFE),
a polychlorotrifluoroethylene (PCTFE),
a tetrafluoroethylene-hexafluoropropene-vinylidene fluoride copolymer (THV),
a tetrafluoroethylene-hexafluoropropene copolymer (FEP),
a tetrafluoroethylene-perfluoroalkyl vinyl ether copolymer (PFA), and
mixtures thereof.

6. The multilayer composite according to claim 1, further comprising one or more layers.

7. The multilayer composite according to claim 6, wherein the further comprised layer or the further comprised layers are selected from the group consisting of
an additional layer of composition I,
an additional layer of composition II, an adhesion promoter layer,
a layer of a moulding compound based on an aliphatic polyamide,
a layer of a polyester moulding compound,
a layer of an EVOH moulding compound, and combinations thereof.

8. The multilayer composite according to claim 1, which is a film, a sheet or a hollow article.

9. The multilayer composite according to claim 8, which is a hollow article and wherein the hollow article is a hollow profile.

10. The multilayer composite hollow profile according to claim 9, which further comprising one or more layers selected from the group consisting of an electrically conductive layer, an elastomer sheathing and combinations thereof.

11. The multilayer composite hollow profile according to claim 9, wherein said composite is a fuel line, a hydraulic line, a brake line, a clutch line, a coolant line, a liner for rigid or flexible pipes in the oil or gas extraction industry or a line for an umbilical.

12. The multilayer composite hollow profile according to claim 9, wherein said composite is a brake fluid container or a fuel container.

13. The multilayer composite according to claim 5, wherein the moulding compound of layer II comprises an ETFE polymer comprising propene, hexafluoropropene, vinyl fluoride, or vinylidene fluoride.

14. The multilayer composite according to claim 9, wherein the hollow profile is a pipe or a container.

* * * * *